US005682328A

United States Patent [19]
Roeber et al.

[11] Patent Number: 5,682,328
[45] Date of Patent: Oct. 28, 1997

[54] CENTRALIZED COMPUTER EVENT DATA LOGGING SYSTEM

[75] Inventors: Frederick J. Roeber; Robert E. Hathaway, both of Portsmouth, R.I.

[73] Assignee: BBN Corporation, Cambridge, Mass.

[21] Appl. No.: 710,101

[22] Filed: Sep. 11, 1996

[51] Int. Cl.⁶ .................................................... H04J 1/16
[52] U.S. Cl. .................. 364/550; 395/568; 395/182.08; 395/182.09; 395/183.15
[58] Field of Search ........................... 364/550, 551.01, 364/267.91; 395/568, 379, 182.08, 182.19, 183.15, 182.1, 182.09

[56] References Cited

U.S. PATENT DOCUMENTS

| | | | |
|---|---|---|---|
| 31,407 | 10/1861 | Furtman et al. | 364/200 |
| 4,166,290 | 8/1979 | Furtman et al. | 364/200 |
| 4,937,862 | 6/1990 | Kosich | 380/3 |
| 5,204,864 | 4/1993 | Won | 371/29.5 |
| 5,337,413 | 8/1994 | Lui et al. | 395/275 |
| 5,365,514 | 11/1994 | Hershey et al. | 370/17 |
| 5,440,722 | 8/1995 | VanderSpek et al. | 395/183.19 |
| 5,450,586 | 9/1995 | Kuzara et al. | 395/700 |
| 5,500,855 | 3/1996 | Hershey et al. | 370/17 |
| 5,526,283 | 6/1996 | Hershey et al. | 364/514 C |
| 5,568,471 | 10/1996 | Hershey et al. | 370/17 |
| 5,581,482 | 12/1996 | Wiedenman et al. | 364/551.01 |
| 5,602,729 | 2/1997 | Krueger et al. | 395/704 |

OTHER PUBLICATIONS

Haban, et al., *A Hybrid Monitor for Behavior and Performance Analysis of Distributed Systems*, Feb. 1990, vol. 16, pp. 197–211.

Ogle, et al., *Application–Dependent Dynamic Monitoring of Distributed and Parallel Systems*, Jul. 1993, vol. 4, pp. 762–778.

Miller, et al., *IPS: An Interactive and Automatic Performance Measurement Tool for Parallel and Distributed Programs*, 1987, pp. 482–489.

Tokuda, et al., *A Real–Time Monitor for a Distributed Real–Time Operating System*, SIG Plan Notices, vol. 24, pp. 68–77.

Plauger, David, *UNIX Kernel Metrics*, pp. 319–323.

Segall, et al., *PIE: Programming and Instrumentation Environment for Parallel Processing*, IEEE Software, Nov. 1985, pp. 22–37.

Plattner, Bernhard, *Real–Time Execution Monitoring*, IEEE Transactions on Software Engineering, vol. SE–10, No. 6, Nov. 1984, pp. 756–764.

Tsai, et al., *A Noninvasive Architecture to Monitor Real–Time Distributed Systems*, Mar. 1990, pp. 11–23.

(List continued on next page.)

Primary Examiner—James P. Trammell
Assistant Examiner—Patrick Assouad
Attorney, Agent, or Firm—Brian L. Michaelis

[57] ABSTRACT

Event logging using a single board computer control card configurable onto a backplane containing target processor(s) being monitored. A high resolution clock on the control card time stamps events. Memory on the control card provides a central buffer to store event data, and stores a control program effecting functionality of the card A network interface a facilitates communication with host computer(s) for post processing of event data and to control, communicate with and access the control card. A control program effects event data collection and organization/storage of events in control card memory. The control program coordinates retrieval of events from an event interface area of memory on slave target processors prior to processing by the control card. The control program coordinates offloading of event data from the control card to host computer(s) for post processing by known software visualization tools. Target software is instrumented with calls to a macro which in turn calls the logging function to effect recording of events. The event records are temporarily stored in an event interface portion of memory on the control card or in a buffer on the target processor(s).

24 Claims, 4 Drawing Sheets

OTHER PUBLICATIONS

McDonald, et al., *A Flexible Distributed Testbed for Real-Time Applications*, Oct. 1992, pp. 25-39.

Bhatt, et al., *An Instrumented Testbed for Real-Time Distributed Systems Development*, 1987, pp. 241-250.

Gielen et al., "The Design of D.A.R.T.S.: A Dynamic Debugger for Multiprocessor Real-Time Applications" 1991.

CENTRALIZED COMPUTER EVENT DATA LOGGING SYSTEM

FIELD OF THE INVENTION

The present invention relates to software and software system development tools, and more particularly to an improvement for tools used to collect and display information about timing inter-relationships and behavior of a program.

BACKGROUND OF THE INVENTION

Software development tools are known for improving productivity and effectiveness of efforts relating to software systems development and/or software systems integration. Software visualization tools known in the art provide powerful mechanisms to control and analyze, among other things, program flow and timing aspects of a program in the context of its operating system and hardware environment. Visualization tools facilitate analysis of interprocessor communications when integrating multiprocessor applications. Such tools typically implement a concept known as "event logging" to monitor and record actions or events as they take place within a "monitored program", i.e. the program being observed or analyzed.

Generally, event logging is implemented by "instrumenting" or adding code to a program to be monitored or analyzed, such that the added code creates a record of when particular events occur in the program as it is being run on the computer. The record created typically contains a set of entries for individual events where each entry indicates an event type, such as an I/O or bus operation, the start or end of a process, or the like. The record created will include the time that the event occurred based on the system clock, and may also include some data relevant to the event. At some point, usually after execution has completed for the program being monitored, the record of events may be analyzed to determine what actions took place at what times within the computer program being observed. With many embedded applications, there is so much data associated with the event logging that the data has to be transferred to another computer system during operation to prevent it from being lost.

Some conventional event monitoring systems have been implemented purely in software as event logging programs. With most known event logging programs, the application software that is being monitored is executed on the same computer as the software that performs the event logging functions. In such implementations the event monitoring program effectively shares hardware resources with the program being monitored and has a detrimental impact on the effectiveness of the event logging function in that the event logging program interferes with the program being monitored. The event logging processing can be fairly time consuming, especially when it involves using the monitored system's resources to periodically transfer collected data to another computer for storage and analysis. This processing overhead perturbs the performance of the software being monitored and makes the information obtained in monitoring less valuable.

In addition to the detrimental impact event monitoring programs can have on the system being monitored and the data obtained, not all processors on which event monitoring programs might be run have the hardware support to perform event logging in an optimal fashion. For instance, many processors do not have access to a high resolution timer/clock that can be used to "time-stamp" events to determine with a high degree of accuracy when events occur.

Furthermore, in systems that involve multiple processors, the event data that is recorded usually cannot be correlated between processors. That is, when events occur in different processors in a multi-processor system, the events are typically time tagged according to the clock of the processor in which the particular event occurred. Unfortunately, there is often no relation between the clocks on the different processors in the system, so accurate correlation between events occurring in the different processors can not be assured.

Hybrid implementations of event monitoring systems are known in the prior art. Such hybrid systems generally have been implemented as event monitoring software running on dedicated hardware other than the system being monitored. The primary advantage of such implementations is that interference of the system being monitored by the event monitoring system is minimized. As described by Haban and Wybranietz (referred to hereinafter as "H&W"), in *A Hybrid Monitor for Behavior and Performance Analysis of Distributed Systems*, IEEE TRANSACTIONS ON SOFTWARE ENGINEERING, VOL. 16, NO. 2, pp. 197–211, FEBRUARY 1990, specialized hardware support can be implemented in each node of a distributed system to include the necessary hardware running event monitoring software for the specific monitoring application.

The system described by H&W includes a special "test and measurement processor" ("TMP") that facilitates event monitoring upon receipt of a data value issued by an instrumented, i.e. monitored, program running on a target or monitored processor. The target processor running the monitored software issues data in accordance with the occurrence of events as determined by the instrumented, monitored software. The TMP receives the data issued by the monitored software and target processor as incoming data. Monitoring software running on the TMP, i.e. an event monitor program, decodes the data to record occurrence of the particular event.

Disadvantageously, application of such a system is limited to target processors that are bus masters, having the capability to control a bus to send data to the TMP. The system described by H&W generates events by instrumenting the monitored program with an instruction inserted at the appropriate place(s). Each event is marked by a store instruction. The instruction format includes an address and a value. The value is sent across the system bus to the TMP address indicated. In order to perform this operation the target processor must be a bus master. Limiting use of the H&W system to target processors that are bus masters seriously limits the range of hardware with which the H&W event monitoring mechanism can be used. Further, if there is a lot of bus traffic the bus access required can be delayed, negatively affecting application timing.

The address portion of the instrumenting instruction in the H&W mechanism represents an event class. In the H&W implementation the TMP can distinguish between 256 classes designated by a range of addresses. Thus, the system is limited in that the number of distinct events that can be monitored is a function of the available memory range that can be decoded. Such a limitation leads to inflexibility in an event monitoring system. Limited flexibility in turn imposes limits on the applicability of such a system, precluding its use in applications where large numbers of processors are involved generating large numbers of events.

The value parameter associated with an event store instruction in a system according to the H&W model serves as a parameter which specifies or identifies event specific data. The H&W design only allows one data value per event, which effects still another limitation in that in certain applications more than one data value per event may be desirable.

Furthermore, the prior art H&W approach to event monitoring is inflexible due to an implementation that requires that the hardware and software parts of the monitoring tool become a permanent part of each node being monitored. The logging instructions in the monitored code fail if the TMP hardware is not present in the system, preventing operation of the application. Thus instrumented software can only be used if the TMP is present. Accordingly, a TMP is required in all systems with monitored software, which limits where the monitored software can be used. Similarly, monitoring requires a specially designed TMP interface specific to the system bus being used, which limits the application of the monitoring system as a function of the particular bus interface.

SUMMARY OF THE INVENTION

The present invention provides a method and apparatus for event logging in a flexible, extensible and minimally intrusive implementation for systems composed of one or more target processors that may be bus masters or slave-only.

According to the invention, an event logging mechanism is effected as a hybrid implementation having hardware and software components. The event logging mechanism's hardware component includes an off-the-shelf single board computer or control card configurable onto a backplane containing the target processor(s) being monitored. A high resolution clock on the control card is used to time stamp events. A portion of memory on the control card is used as a central buffer to store event data, while another portion of memory on the control card is used to store a control program that effects functionality of the control card. The central buffer of memory resident on the control card is used to collect event records from the target processor(s) for transfer to one or more host systems for post processing of event data. The control card includes a network interface to facilitate communication between the host computer(s) used for post processing of event data and to control, communicate with and access the control card.

The software components of the event logging mechanism include a control program that effects functionality using facilities on the event logging mechanism control card. The control program effects event data collection and organization/storage of events in the central buffer in control card memory. The control program coordinates retrieval of events from an event interface area of memory used to retain event data on slave target processors prior to processing by the control card. The control program coordinates transfer or offloading of event data from the central event buffer on the control card to the host computer(s) for post processing.

A host program portion of the event logging mechanism software components effects control interface software including a graphical user interface that runs on a host computer communicating with the control card over the network interface. The host program portion includes interfaces for known software visualization tools that may be configured to receive event data offloaded from the control card for display and further manipulation.

The event logging mechanism according to the invention processes events occurring in target software instrumented with calls to a macro that performs in-line checks to determine whether logging is enabled, and which in turn calls a logging function to effect recording of events as the target software runs on the target processor(s). The logging function resident for execution on the target processor, responding to "logging calls," receives parameter inputs from the macro invocation in the instrumented code. The parameters include an event identification value (event id), event class value, and event specific data values. The function called to run on the target processor(s), as a result of logging calls, acts as a collection mechanism or target data collector that stores the parameters as an event record for further processing. The event records or "events" are temporarily stored in an event interface portion of memory on the control card or in a buffer on the target processor(s). The event collection function and/or macro also facilitate discarding of events when the event mechanism hardware is not present in the target system and/or event monitoring is not enabled.

The event mechanism according to the invention operates in several modes including a first mode, or master mode wherein the target processor, i.e. processor being monitored, has bus master capabilities and can transfer event data from the event interface buffer in the target processor directly to memory on the control card of the event logging mechanism. In the master mode the target processor itself time stamps events by reading the central high resolution clock on the control card and attaching a time stamp just prior to transferring the event data or record over the bus for storage in the control card's memory.

A second mode or slave mode is implemented for target processors that are not configured with the capability to access memory on the control card, i.e. for non-bus master target processors. Slave mode can be used with processors that lack bus master capabilities altogether, or with processors that can be bus masters but the situation makes it desirable to avoid additional bus contention. In the slave mode the event record is stored in the event interface portion of memory on the target processor(s) without a time stamp. The control card is notified by the target processor, e.g. by an interrupt, that an event record is available. The control card executes an event interrupt handler upon receipt of notification, determines the source of the interrupt, and records an event notification item in the form of an event index, a target identification value and a time stamp. The control card periodically accesses the event interface portion of memory on the slave target processor(s), e.g. approximately every 0.5 milliseconds, to collect available event records if any events have been indicated via interrupt. Slave targets that can not generate interrupts are checked at the same periodic rate, i.e. approximately every 0.5 milliseconds, to determine if they have any events available. The control card effects transfer of the available event records from the event interface portion of memory on the slave target processor, attaches an appropriate time stamp, and stores the retrieved event record(s) to the central event buffer on the control card.

When the central event buffer on the control card fills up, the event card effects transfer or offloading of the event data to one or more host systems, via the network interface, for further analysis and display.

Features of the invention include provision of a highly portable, minimally intrusive event logging mechanism that can be implemented in a wide range of target environments including bus master or slave-only target processors. Flexibility of the event logging mechanism according to the invention is enhanced by an architecture that includes the capability to interface the target data collector to various, selectable target processors or environments. Because of the use of macro and/or function calls specifying an event ID value, the identification of events is not limited by memory addressing constraints, so the event mechanism according to the invention can be implemented in systems generating a large number of events, or in multiprocessor systems having a large number of processors generating a large number of events. Centralized event data collection is handled by off-the-shelf hardware including a high resolution clock that effects highly accurate time tags of events that are logged by way of a centralized event buffer. The high precision time source facilitates accurate event logging with application processors that do not themselves have accurate timers. Central collection and timing of events occurring on target processors on a common backplane facilitates ease of interrelating interprocessor activities. Use by master targets of the event mechanism's control card memory for storage of all events, and storage of only a small number of event entries in slave target processor memory minimizes the amount of target processor local memory involved in the event monitoring process and generally minimizes intrusion of the event monitoring mechanism on the system resources. Periodic transfer of events to a host as facilitated by the event mechanism according to the invention conserves and/ or frees up target processor memory and control card memory. The off-the-shelf control card implemented, has large memory capacity in order to store large amounts of event information prior to uploading to a host, which is advantageous in reconstructing system performance after a major system failure (referred to as "post-mortem" analysis). Flexibility in implementing network interfacing permits event data to be rapidly offloaded to host processor(s) via high speed network interfaces on the control card of the event mechanism, that may not be available on the target processor.

BRIEF DESCRIPTION OF THE DRAWING

These and other features and advantages of the present invention will be more apparent from the following detailed description of an illustrative embodiment thereof, taken in conjunction with the drawings, in which.

DETAILED DESCRIPTION

Figure 1:
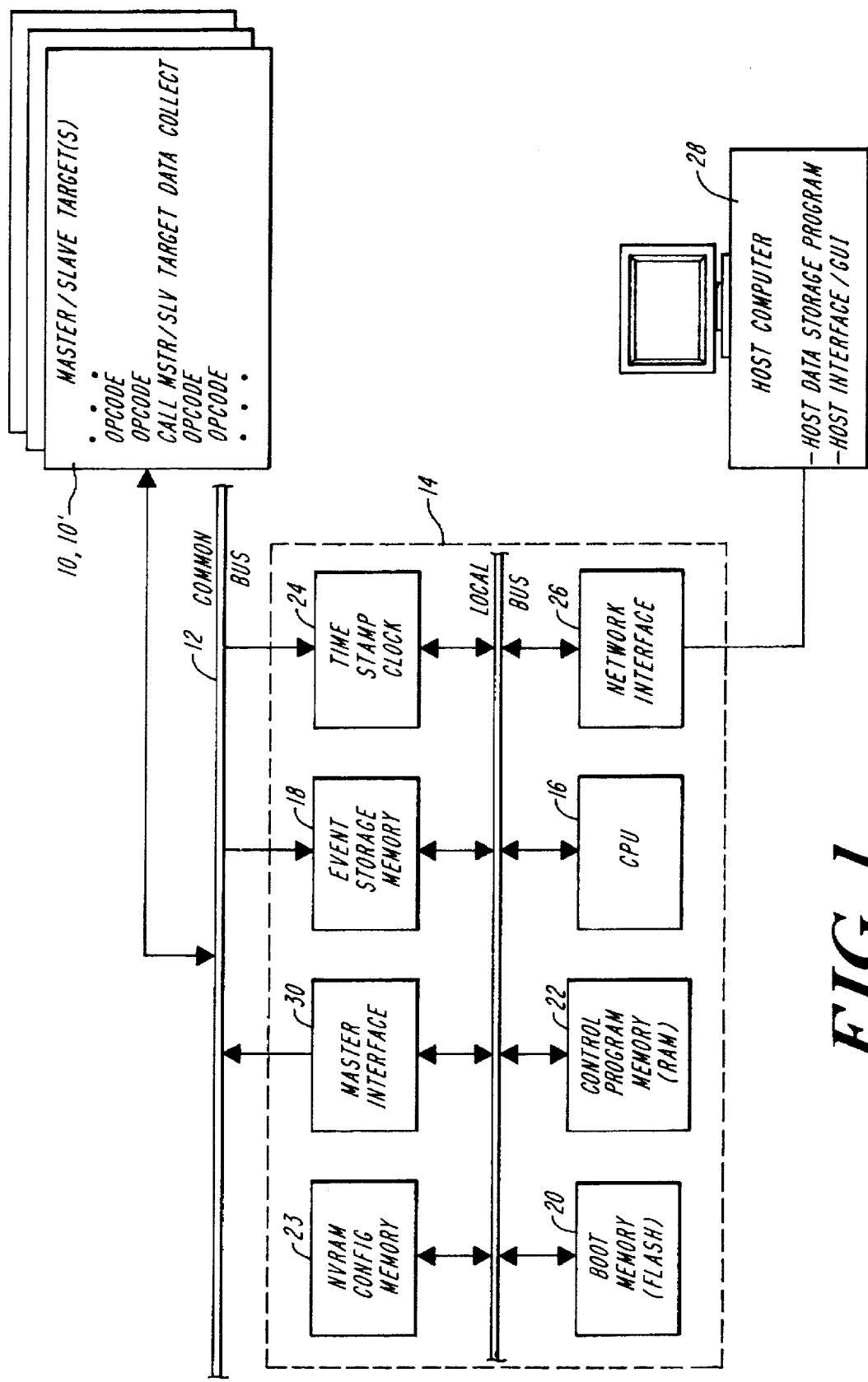
FIG. 1 is a block diagram of an event logging mechanism according to the invention.

As illustrated in FIG. 1, an event logging mechanism according to the invention involves an instrumented application program or other code running on one or more target processors 10 connected via a common backplane or bus 12, such as VMEbus. According to the invention, the event logging mechanism is a hybrid implementation having hardware and software components. The event logging mechanism's hardware component includes an off-the-shelf single board computer or control card 14 configurable onto a backplane along with the target processor(s) 10 being monitored. In the present illustrative embodiment wherein the common bus is the VMEbus, the control card 14 is implemented with a Motorola MVME162LX or single board microcomputer, which is described in detail in the MVME162LX Embedded Controller Programmers Reference Guide, which is incorporated herein by reference.

The control card 14 is based on a Motorola microprocessor or CPU 16 that coordinates event mechanism activities, as described hereinafter. The control card 14 includes significant amounts of on board memory. Several megabytes of memory on the control card are dedicated as event storage memory 18, used to store collected event information. Boot memory 20 is FLASH memory or PROM (i.e. non-volatile memory) used to store a control program that effects functionality of the control card 14. Another portion of memory is control program memory 22, constituted by RAM used to store an image of the control program that is downloaded from boot memory 20 for execution. Initialization and configuration information used by the control program is stored in non-volatile configuration memory 23. The control program in FLASH memory 20 is easily updated, such as to add new functionality to the event mechanism. This substantially ensures that the event mechanism is extensible and won't become obsolete since it can be easily enhanced to work with new visualization tools that are developed. Furthermore, having initialization and configuration data used by the control program in modifiable non-volatile RAM facilitates easy adaptation for different target environments.

Communication with the control card 14 of the event monitoring mechanism according to the invention, is effected through a network interface 26. The network interface 26 facilitates connection of the control card 14 to one or more host workstations 28, running interfaces for software visualization tools, which receive event data from the event monitoring mechanism for post-collection processing. A graphical user interface program is provided on the host(s) 28 that can be used to easily configure and control the event monitoring mechanism. In one illustrative embodiment of the invention the host workstation is a Sun Sparc workstation running the WindView software visualization tool by Wind River Systems under the Solaris 1 or Solaris 2 operating system. The network interface 26 in the illustrative embodiment is an Ethernet interface, and the control card 14 features a front panel Ethernet AUI connector that allows easy access for hooking up any of various types of highspeed Ethernet connections known in the art. The graphical user interface software stored is an X Windows based GUI that can run on the Sparc workstation to easily configure and control the control card 14 over the Ethernet connection.

The control card 14 is also connected, via a bus master interface 30, to the common bus or backplane 12 along with the target processors 10. The control card is configured to act as a substantially self-sufficient node on the common backplane, which can operate as a standalone processor. This facilitates post-mortem operation by allowing the event mechanism to upload data that preceded a target processor or system crash. When event logging is being effected, event data from the target processor(s) is transferred over the common backplane 12 and then the control card 14 takes care of all of the Ethernet communication required to upload the data to one or more hosts 28 for analysis.

The control card 14 includes a high resolution clock 24 used to time stamp events. A primary purpose of using a software execution visualization tool, like WindView, is to collect and display information about the timing interrelationships of a program running on a target processor. To get useful information on program behavior, the visualization tool event collection code running on the target processor must have access to an accurate clock that it can use to determine when each event occurs. The clock is read in order to determine the "time stamp" to be associated with each event. Many target processors do not provide clocks with good accuracy, so the timing information is of questionable usefulness. When the event mechanism according to the invention is used, all targets can get their time stamps from the time stamp clock 24 available on the control card 14. The time stamp clock 24 has one microsecond resolution, which allows event occurrences to be measured with that accuracy, regardless of the target processor's clock facilities.

The illustrative embodiment of the event mechanism according to the invention, generally described hereinbefore, involves a commercial VME-based single board computer (manufactured by Motorola) running a specialized software program to effect its operation. The event monitoring mechanism generally, and the control card specifically, is used by plugging the control card into a spare slot in a VME system under development and connecting it to an Ethernet network, as known in the art. The network connects the control card 14 to the host workstation(s) 28 running the software execution visualization tools like WindView.

Figure 2:
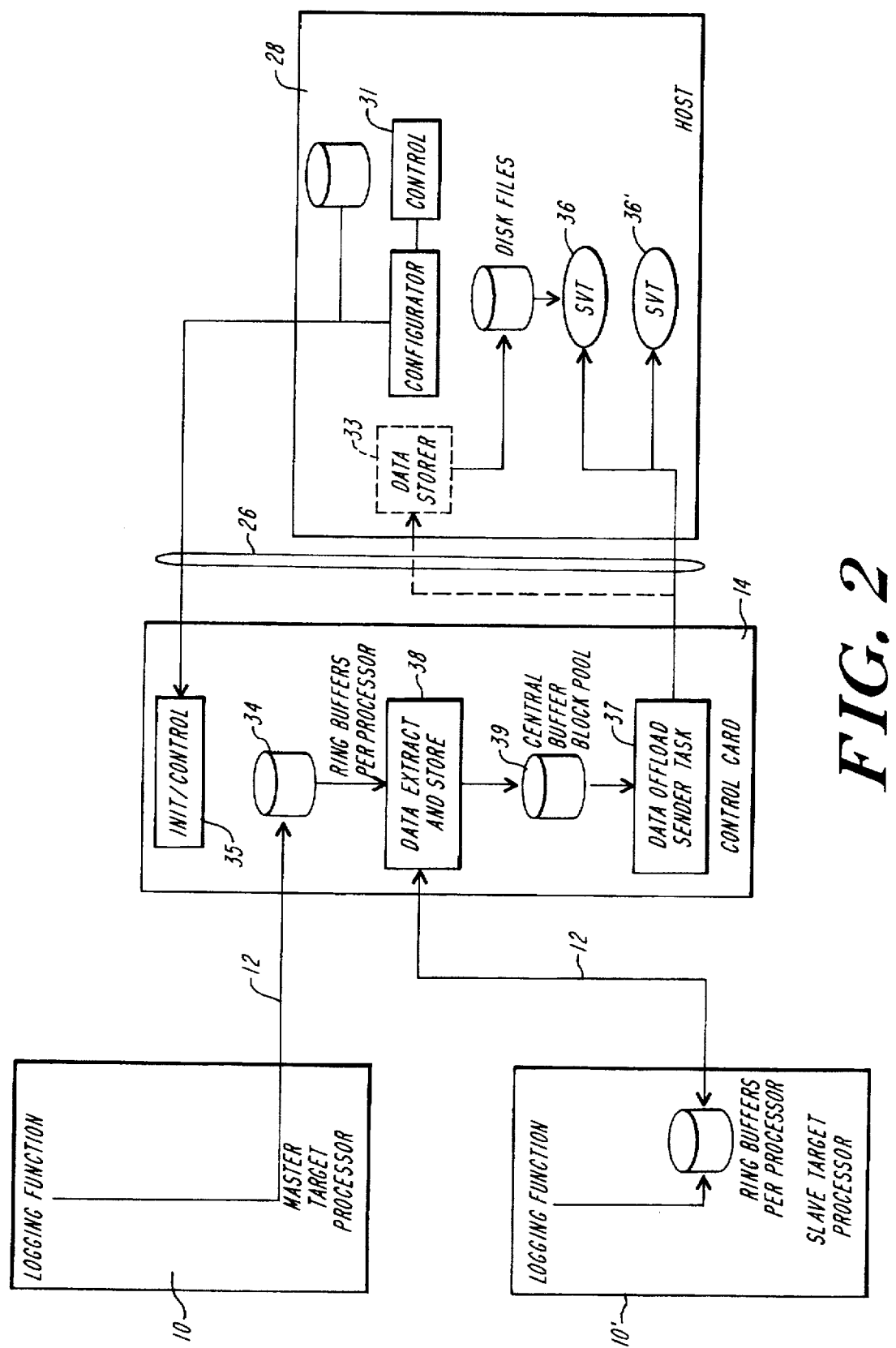
FIG. 2 is a block diagram illustrating a distribution of functional components of the event logging mechanism of FIG. 1.

The monitored program running on the target processor(s) 10 is instrumented, i.e. includes calls or event logging requests, which initiate logging and collection of events by the event mechanism according to the invention. The event mechanism processes events according to one of two modes, i.e. slave mode or master mode, discussed in detail hereinafter. The particular mode is a function of the capabilities of the target processor being monitored. The event monitoring mechanism overall, regardless of the mode of functionality is comprised of functional components that are distributed, as illustrated in FIGS. 2, among the target processor(s) 10, the control card 14 and the host(s) 28.

TARGET PROCESSOR

This illustrative embodiment of the event monitoring mechanism is configured having event collection functionality resident on the target processor(s) 10 being monitored. The software being monitored and running on the target processor(s) is instrumented with calls to a macro which in turn makes calls to an event collection function, in effect making event logging requests. The macro is used to check event collection or monitoring status, i.e. to determine if event logging is enabled or disabled, prior to calling the event collection function. The use of a macro call to check monitoring status and call the event collection function effects efficiencies in that there will be no function call overhead unless event collection is enabled (or available).

Event monitoring according to the invention is configured to be enabled or disabled, in a "local mode" by each target application(s) or in a "global mode" by any target application or by the control card under command of the host interface program. The selection of local or global mode control is a configuration option initially selected by the user. In the local mode event logging is enabled or disabled solely by an individual target, so as to have an affect only on that target. In such a case, the target application is coded to invoke a function that controls enabling and disabling the logging activity on that target processor. Alternatively, global logging control can be set such that enable/disable requests affect all processors in a baseplate in parallel. With global control selected, any processor in a baseplate can call a function to set a flag to enable or disable logging in all processors.

In addition to local and global enable/disablement of the event monitoring mechanism, logging can be made "unavailable" in a system without affecting target system configuration, i.e. the control card can be left in or taken out of the backplane. The architecture of the event mechanism according to the invention is such that the availability of event monitoring in a system can be effected without having to make any changes to an instrumented application, i.e. logging calls can be left in the code without affecting program operation. The use of the macro to insert instrumentation calls allows all aspects of the event monitoring mechanism to be effectively removed, i.e. made unavailable, from the target or monitored application, without application code changes, by selective compilation. That is, by merely removing the link to the instrumentation macro when the instrumented application is compiled, precluding compilation of the macro, event monitoring will no longer be available as no calls to the event collection function can be made. The system overall will be unaffected by the presence or lack of a control card in the backplane, and the system overall will not be impacted by the presence of logging calls in the instrumented code when the logging function is unavailable.

The particular functionality of the function called and executed as a result of the logging request is dependant upon whether the target processor on which the instrumented code is running is going to use bus master capabilities, or is restricted to slave only operation. According to the invention, the event collection function can be selectively compiled to support master or slave only operation. In some monitoring situations, it may be desirable to use slave mode operation with one or more target processors that have bus master capabilities. In such a situation additional bus contention would be avoided by selecting the slave mode event collection operation. The user of the event monitoring mechanism can select a complement of code for compiling that is consistent with the capabilities of the target processor, and effects the desired master or slave operation, as described hereinafter. In this manner, only appropriate code, i.e. effecting master or slave mode operation, is linked, as known in the art, with the software being monitored.

Referring now to FIGS. 1 and 2, execution of the event collection macro(s) by the target processor(s) 10 initiates event collection functionality on the target processor(s). In order for the event mechanism according to the invention to be functional, master or slave mode operation is effected in part by the event collection or logging function, also run on the target processor. The event collection function facilitates collection of recorded events relating to the instrumented application running on the target processor 10. During slave mode operation, the event collection function run on the target processor initially collects events in a circular buffer 32 in memory resident on the target processor 10' that generated the event. In master mode operation events are initially stored in a circular or ring buffer area 34 of event storage memory on the control card 14. The control card 14 includes a respective ring buffer for each master target processor being monitored. The events recorded are ultimately collected on the control card 14 and transferred to a host processor 28 for display and/or manipulation by software visualization tools (SVT) 36, 36', as known in the art. In the present illustrative embodiment, the event collection function is installed on the target processor(s) during compilation and linked with the software being monitored, effectively becoming a part thereof. Depending upon the capabilities of the target processor(s), i.e. bus master or slave-only, and/or monitoring constraints, the mode of operation can be specified by the user by linking only a version of the event collection function having the desired operation.

Generally, the inputs to the collection function as passed by the macro called from the instrumented application include an event ID value, event class value, and a number of parameters or event specific data values. The collection function simply groups the event information together by event class. The collection macro has access to a logging enable control flag and a logging class enable bit mask set during configuration. If logging is enabled for a particular class, the events are further processed. If all event logging is disabled, or if logging of the corresponding event class is disabled, the events identified by the collection macro as a result of instrumented calls are just ignored. Accordingly, in contrast to prior art systems (such as the H&W mechanism described hereinbefore), the event logging mechanism according to the invention will not impede functioning of an instrumented application when a control card is not installed.

In addition to the event ID value and event class value, each of the collected events is assembled in a record which may comprise a maximum of five 32 bit parameters that can be logged for any event. A user may specify parameters depending on specific monitoring application requirements. The formatting and layout of the parameters for different events are controlled by the user by specifying the formats, on a per event basis, on the host as part of the initialization/configuration process.

The event classes supported by the event mechanism according to the invention facilitate grouping of a set of events by class. Any event can belong to one class and will be grouped according to that class. The user explicitly specifies the class a specific event is to be associated with in the logging call. Classes are provided simply to allow efficient control of selective logging. When logging is turned on, a subset of the event classes can be enabled/disabled for collection. For instance, it may be desirable to only enable a set of events that corresponds to disk I/O activity, in order to monitor disk usage. By grouping those events into a class designated in the macro call this can be easily done. It is up to the user to group events into classes in such a way that allows them the level of logging control they require for a particular application.

The target data collection function is designed to emphasize efficiency. In a preferred implementation of the event monitoring mechanism according to the invention, there is a single instance of a target data collection function running in each target processor, centralizing the logging of events from that target. The single instance is a conditionally compiled version of the function providing functionality for either master or slave target processors That is a single function includes common functionality for both master and slave target data collection, and includes additional functionality for slave target data collection so that slave target processors, which cannot write event information directly to the control card 14 event storage memory 18, can alternatively store event records in local memory to be retrieved by the control card. Additional functionality is provided on the control card for accurately time tagging events occurring in slave target processors, which cannot read time tags directly from the time stamp clock 24 on the control card 14. In this implementation, as discussed hereinbefore, code that differs is conditionally compiled via a compiler control command, as known in the art. Again, the functionality of the function selected by the user to be compiled depends upon whether a particular target processor supports bus master capabilities or is to be used as slave-only.

Master Target Data Collection

An event collection function run for a target processor that has bus master capabilities, hereinafter referred to as a "master target data collection function," includes functionality to assemble an event record and effect transfer of event information across the common bus 12 to write the event information directly to a respective ring buffer 34 in the control card 14 event storage memory 18. The ring buffer 34 on the control card can be accessed by the control card when the control card detects that new event data is available.

The master target data collection function obtains time tag information for the event record, as the target processors with bus master capabilities can also read time tags directly from the time stamp clock 24 on the control card 14. It should be noted that this function should be coded in a re-entrant fashion as known in the art, to allow the function code to be called from any software running on a target processor. Such software running on the target processor might include different user tasks/threads, operating system components, and even interrupt handlers, any of which a user may desire to have instrumented to make calls to the target data collection function.

For target processors that can be VME bus masters, events are logged in an optimum fashion via the master target data collection function. In the illustrative implementation described herein incorporating the MVME162LX card, on-card chips can be mapped onto the VME bus. By mapping one of the chips that contains a high precision time source onto the VME bus, bus master target cards can have direct access to the time source. Master target cards can then read this clock and store the resulting time tag as part of the event record in the event buffers they record. Since all targets will use the same high precision timer, the tags will all be accurate and based on the same time scale.

The target data collection function is also responsible for attaching and storing in the event record trace ID values of the event entries to reflect the application entity, or portion of the instrumented application, that generated the event. There is some variation in what the trace ID values represent, but generally ID values are a function of the occurrence of the event and are based on the specific software running on the target processor. For targets running some sort of operating system, it is intended that the trace ID represent a task identification value. Essentially, the trace ID is an arbitrary value that may be used by a software visualization tool to distinguish an event and indicate the source of an event within a target application.

The event record assembled and stored by the target data collection function includes: the trace ID which indicates the application entity that generated the event; the event ID that uniquely identifies the event; the time tag indicating when the event occurred; and the event specific data parameters which are based on user requirements. The event record may also include control bits or flags to indicate event conditions, such as: event ring buffer overflow; event record overflow (i.e. more parameters passed than the fixed maximum); and/or event chaining to support more parameters in the event record space allotted by combining sequential event records.

As discussed, master target processors have bus master capabilities to directly access the high precision time source located on the control card and mapped onto the VME bus. Similarly, for master target processors, the respective target processor circular buffer 34 physically located in event storage memory 18 on the control card 14, is mapped onto the VME bus so as to be accessible to the master target processor(s) for direct recordings of events therein. The beginning address and ending address of the circular buffer 34 is tracked and accessible to the target processor(s). The master target processor 10 also has access to two index values, a storage index value that is updated by the target processor whenever an event is stored, and a removal index value that is updated by the control card 14 whenever an event record is removed from storage.

Figure 3:
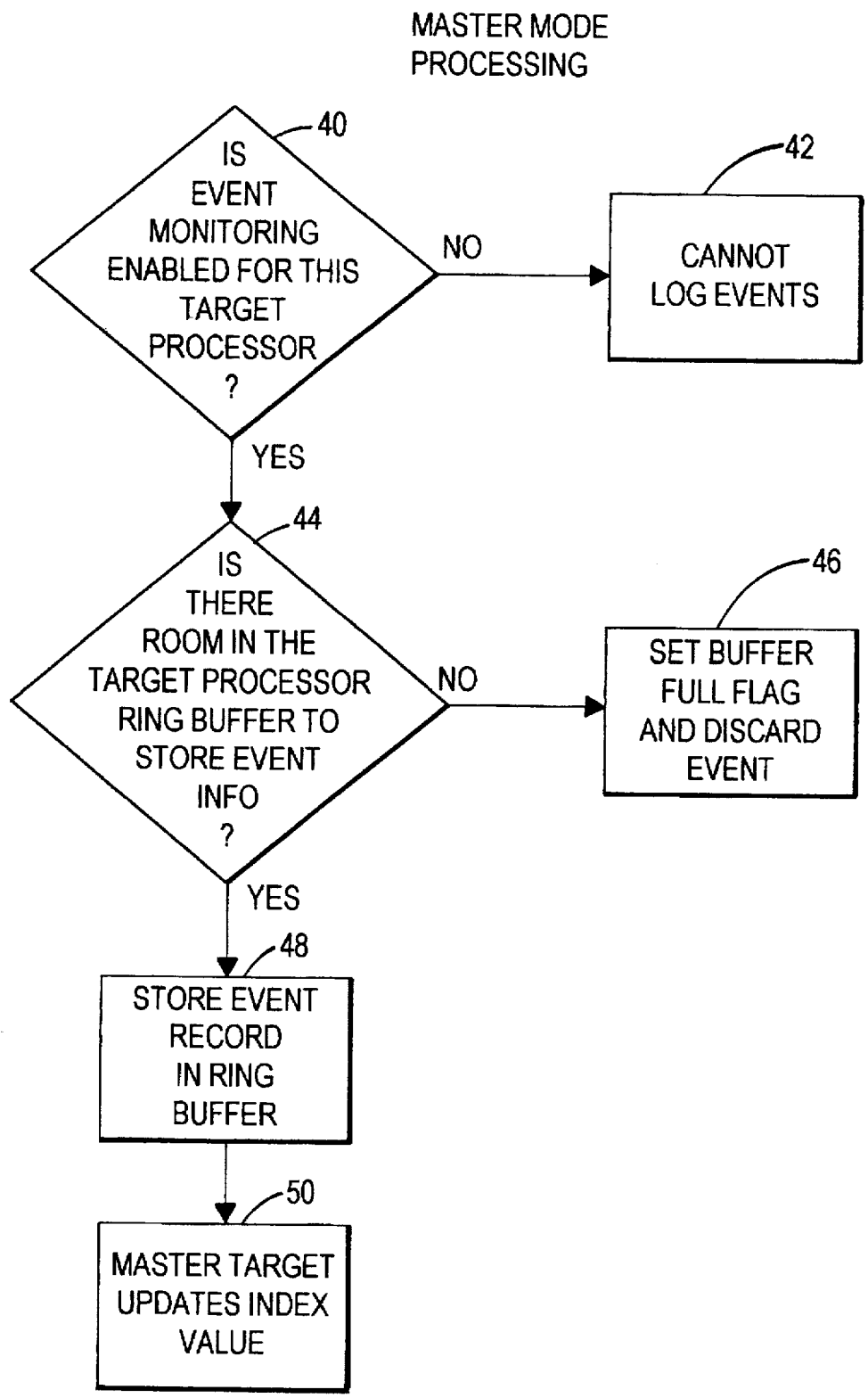
FIG. 3 is a flow diagram of operation of master mode processing of the event logging mechanism of FIGS. 1 and 2.

In effecting master target data collection, as illustrated in FIG. 3, it is first necessary to determine if logging is enabled 40 for a given processor and/or for a particular event class. If logging is disabled 42, logging requests will be ignored. If logging is enabled, a determination must be made as to whether there is room 44 in the target processor ring buffer 34 in the control card event storage memory 18 to store additional events. If there is no room, then a buffer full flag is set and any new events generated, i.e. by calls to the target data collection function, will be ignored effectively discarding 46 the event(s). When space is again available in the buffer, the first event stored thereafter will include an overflow flag set in the event record to signal that events have been lost. If there is room in the circular buffer then an event record is stored 48, including the event ID, the trace ID value, the associated time tag, and the event specific data values or parameters that are a function of the instrumented application. As events are stored by the master target processor 10 in the circular buffer 34 on the control card 14, the target processor updates the storage index value 50 used to track storage of event entries.

With master target processors, which time tag events and store the event information directly in control card event storage memory 18, there is no reason for the target processor to notify the control card that the event has been stored. Instead, the control card functionality, described in detail hereinafter, includes a mechanism that periodically checks its own buffers 34 used by the target processor(s) to store events, picks up any new ones it detects for uploading to the host, and updates the removal index value accordingly. This avoids some interrupt handling overhead on the control card and eliminates all the associated VME bus interrupt cycles.

Furthermore, in the event monitoring mechanism according to the invention, there is no data format conversion done on the target processor when event data is stored in the circular buffer(s). Any format conversions, e.g. to conform data byte ordering of a target processor with that of the control card, are done at a later point in the logging process in order to further minimize the event monitoring mechanism's impact on target processor overhead. Format conversions are done on the host, as needed, and are generally provided for by the software visualization tool or another user program. Similarly, any data passed between the target data collection function and the control card is in a format native to the target processor to minimize target processor overhead. It should be noted that for target processors with memory management units or cache control, the target processor must be set up so that the event buffer area is uncached and always accessible at a fixed address.

It will be appreciated that in the present illustrative implementation involving target processors connected to a VME bus, different address spaces and data access modes can be supported. By default, it is assumed that only A32, i.e. 32 bit, control card mapping (not A24 or A16) will be used. This means that when target processors write data to buffers contained on the control card, it is assumed that they support and use A32 addressing, however, it will be appreciated that other available addressing schemes can be supported.

Slave Target Data Collection

Slave target event collection processing, like the master target data collection processing described hereinbefore, runs on the target processor to effect collection of event data in a circular buffer (however the circular buffer 34 for the master target is effected on the control card 14 which is directly accessible by the master target, while the circular buffer 32 for the slave is effected on the slave target). Like master target data collection, events will be ignored if logging is disabled or if the event buffer is full (i.e. blocks 40, 42, 44 and 46 of FIG. 3 apply to slave mode processing as well).

Unlike master target event processing, slave target event data assembled by the target data collection function (which is assembled as described hereinbefore with respect to master target data collection), is stored in the circular buffer 32 in memory on the slave target 10'. The circular buffer 32 on the slave target processor can be accessed by a data extraction and storage mechanism 38 implemented by the control card 14, to overcome the fact that the slave target does not itself have the capabilities to effect transfer of event information across the common bus 12. Accordingly, the slave target event information is stored in a memory area 32 on the slave target processor that is accessible from the VME bus and the control card 14 accesses that memory to read the information out of those areas.

Figure 4:
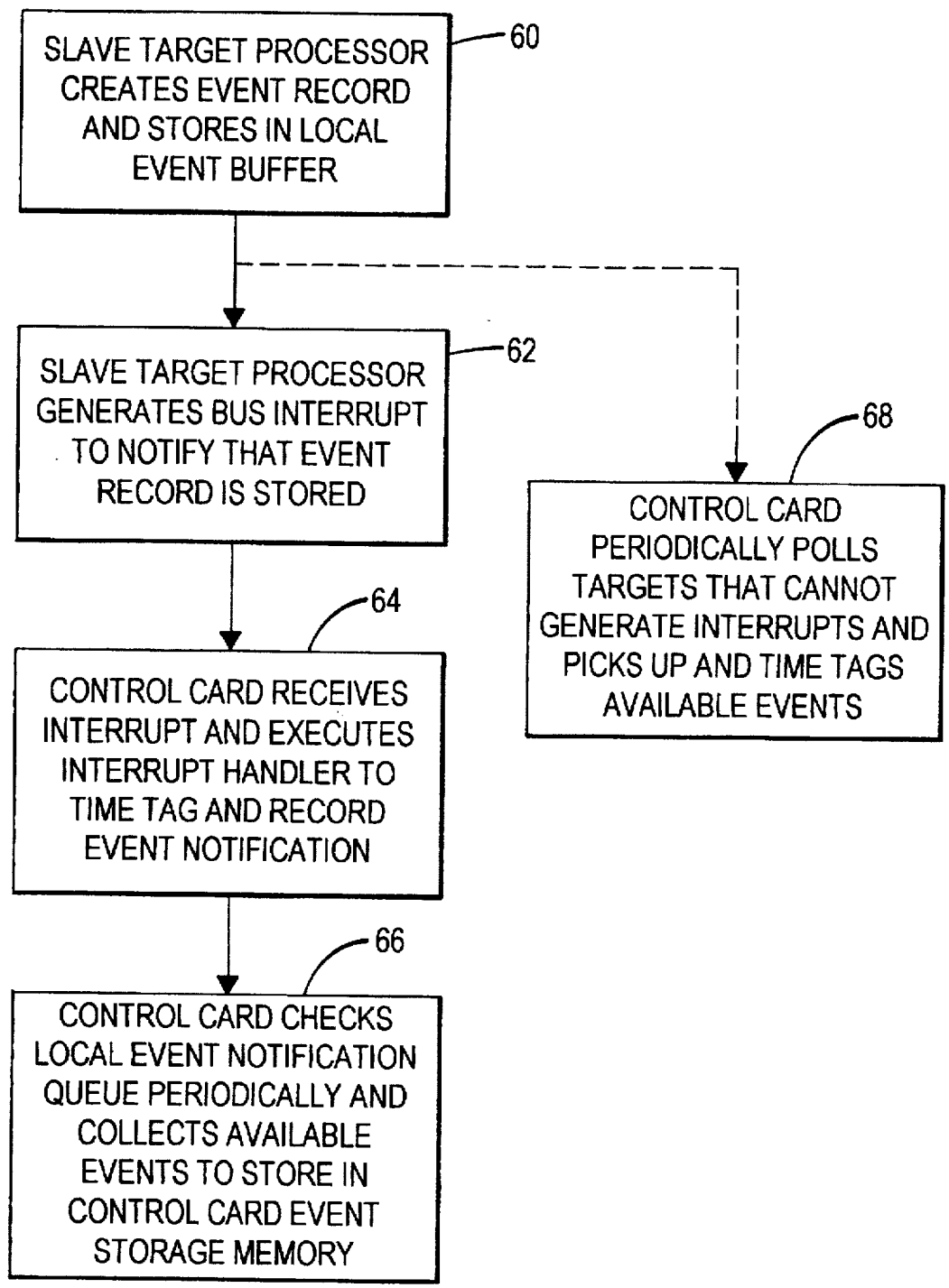
FIG. 4 is a flow diagram of operation of slave mode processing of the event logging mechanism of FIGS. 1 and 2.

In contrast to the master target data collection functionality, slave target processors require added functionality to time tag the event data, because the slave processors lack the capability to read the time stamp clock over the VME bus. Similarly, functionality is required to indicate event availability to the control card so that the control card 14 can pick up event information from the slave target processors 10'. According to the invention, it is desirable to time tag events using the time stamp clock 24 accessible on the control card in order to get consistent time stamps since slave-only cards can not read this clock directly, the control card is used to attach a time tag to events from such cards once it has been notified that the event has occurred. The illustrative implementation according to the invention supports two different time tag methods in slave mode event processing, as illustrated in FIG. 4. In either of the two slave mode time tagging methods, slave mode event processing commences when a slave target processor, as a result of a call from instrumented code to the target data collection macros, creates an event record and stores 60 the event record in a circular buffer on the slave target processor.

A first method of time tagging supports events generated by a slave target processor that has VME bus interrupt capabilities (referred to hereinafter as an "interrupting slave target"). Upon storage of the event record in its local slave target circular buffer, the interrupting target generates a VME bus interrupt 62 that is received by the control card as notification of occurrence of an event. The control card is configured to respond to a selected VME interrupt level, that is selectable as part of the control card configuration. It should be noted that different interrupt levels can be used for different targets. In response to the interrupt and its associated interrupt vector, the control card executes an interrupt handler 64 which records an event notification by storing a time tag, as of receipt of the interrupt associated with that event. The event notification also contains the target processor identification and the target processor circular buffer storage index value which indicates where the event is stored on the target, i.e. where the control card must read from target memory. The event notification identifying the event, the target processor and the time tag are stored in a queue on the control card 14 implemented as part of the data extraction and storage mechanism 38. The control card periodically checks the event notification queue and collects and stores 66 event records from the interrupting target(s) in a central buffer block of a central buffer block pool 39 in event storage memory.

A second method for time tagging events generated by slave target processors supports target processors that can not generate VME bus interrupts. With no means for generating an interrupt or accessing control card facilities over the bus, such slave target processors must be periodically polled 68 by the control card to determine availability of events. Accordingly, the control card periodically polls, e.g. approximately every 0.5 milliseconds, slave target processors that can not generate interrupts. The data extraction and storage mechanism implemented on the control card picks up the event records, and attaches a time tag when polling indicates event availability. This is the least optimum method for notification and time tagging of events, since the frequency of polling limits the accuracy of event time tagging.

The target data collection mechanism according to the invention, whether in the master or slave modes, will not expect to receive any interrupt driven notification from the control card. Any notification type actions will only flow from the target to the control card, which somewhat simplifies target/control card interface requirements. Event logging enable/disable type information is stored by the control card but is only processed by the target data collector when needed.

For purposes of the present illustrative embodiment, to collect event information from slave target processors the control card can be configured to access target memory addresses in any address space. That is, the control card is configurable as known in the art, to retrieve data from target processors on the VME bus that provide A24 (24 bit) addressing as well as from those with memory mapped into A32 (32 bit) address space.

CONTROL CARD

As described hereinbefore, functionality of the event collection mechanism according to the invention is distributed among the target processors which effect the event data collection in one of the master or slave modes, and the control card 14 and host(s) 28. The control card runs the control program stored in control program memory (20, FIG. 1) which processes events from all target processors, i.e. master targets and slave targets, and generally centralizes event data collection functionality by controlling a central repository for receipt of all event information.

In the case of event information from a master target processor, the event records, as discussed in detail hereinbefore, are stored directly by the master target(s) in the ring buffer(s) 34 on the control card. The storage indices get updated by the target processor to indicate that event data, including the time tag etc. is available in the buffer(s) 34. On a periodic basis, e.g. approximately every 0.5 ms, the control card, executing the control program, looks in each of the ring buffers for each of the configured targets to see if there are any event records. When events are found in any given ring buffer, the control card gathers up the events and stores the events for a respective target processor in a respective central buffer block of the central buffer block pool 39.

In the illustrative implementation the event collection mechanism can be configured to support sixty four (64) target interfaces. That is, a respective master or slave event collection function can be instantiated for up to sixty four different targets, the functionality of each event collection function being dependent upon the whether master or slave mode operation (interrupt or non-interrupt capability) is desired. For each of the up to sixty four targets supported in a configuration, there is a corresponding buffer block in the buffer block pool 39 and a corresponding data extraction interface in the data extraction and storage mechanism 38 to either access the circular buffer 32 on the slave target processor (slave mode processing), or to access the ring buffers 34 on the control card (master mode processing) to retrieve event records.

The number of targets supported, i.e. sixty four, is a somewhat arbitrary quantity of target processors selected for support by a single control card taking into consideration the amount of processing required to effect event monitoring in an efficient manner. Each of the target processors monitored, up to the limit of sixty four, is assigned a control card communication "slot" during configuration. The slot identification and target processor type, i.e. master, slave (interrupting/non-interrupting), is stored as a configuration parameter in configuration memory 23 and used by a control card initialization mechanism 35 on the control card 14 to associate an appropriate instance of a data extraction interface (i.e. master mode processing or slave (interrupting/non-interrupting) with the corresponding target for communication with the control card. Each target processor is also identified with a host according to a configuration parameter that specifies which of a possible plurality of hosts is to receive event records for that target processor offloaded from the control card.

Accordingly, the data extraction and storage mechanism periodically runs a checking function, i.e. approximately every 0.5 milliseconds as described hereinbefore, that loops through a table of sixty four possible target processor entries. For each entry, i.e. target processor, the appropriate data collection function is executed to retrieve event records from either the ring buffer 34 on the control card (master target event records) or the ring buffer 32 on the target processor (slave target event records). Event records are retrieved and stored by the data extraction and storage mechanism 38 in the central buffer block pool 39 comprising a portion of event storage memory on the control card 14.

Event data stored in the central buffer block pool 39 is available for passing off to host processor(s) for post event collection processing by software visualization tools 36, 36' running on the host(s) 28. The central buffer block pool 39 is a pool of free memory blocks configured as a queue that is shared by all targets and hosts. As the memory blocks are used they are assigned to a separate queue associated with one of the possible plurality of hosts. That is, there is a separate queue maintained for each one of a possible plurality of hosts, and the event records associated with target processors that are configured to offload their event data to a particular host are assigned to a respective queue associated with that host. In the present illustrative embodiment, eight distinct host interfaces are supported each by a respective event block queue in the central buffer block pool 39. Accordingly, in the present illustrative embodiment, sixty four possible target processors can have events collected on a single control card while the collected events are funneled to up to eight host interfaces.

The event data in the queues in the central buffer block pool are manipulated in real-time by a data offload mechanism and sender task 37 on the control card 14. The data offload mechanism 37 effectively takes the collected event data from the host queues in the central buffer block pool and when a full block is available prepares it for transfer via the network interface 26 over the high speed communication channel, i.e. Ethernet, to a host processor for further analysis. As blocks are freed, i.e. their event records are passed to the host, the blocks are made available in the free memory block queue shared by all targets and hosts.

In the present illustrative embodiment, the data offload mechanism 37 uploads event information to various hosts from multiple targets using a WindView or BBN TimeScan event log file format, as known in the art. The offload mechanism and sender task provides any format conversion required to put the enqueued event record information in the appropriate SVT event file format. TimeScan event files are described in detail in TimeScan User's Guide and TimeScan Event Log Porting Instructions, and WindView event files are described in the WindView User's Guide, which are incorporated herein by reference. Alternatively, other event file formats may be implemented as a function of the SVT running on the host that will receive the event records Effectively, the event records, including the time tag, event ID and event data parameters, are passed to the host system(s) by sending a data stream to the host over a TCP/IP socket as known in the art. The data stream is sent to a host corresponding to the host specified in configuration host information corresponding to the particular host queue in the central buffer block pool 39.

In an alternative, post-mortem operation mode the control card 14 will maintain some number of event buffer blocks in the buffer block pool. For instance, the control card may be configured to maintain the 10 most recent buffer blocks from a specified target. Rather than sending blocks to the host as they become available, the event information will be retained on the control card. In the event of a target system crash, or if there is a particular event occurrence of interest, the control card can be accessed after that event to upload the recent event information of interest.

HOST FUNCTIONALITY

Each of the hosts, up to eight, configured in an event monitoring system are connected to the control card 14 via a known in the art network interface 26 which in the present illustrative embodiment is an Ethernet interface. A typical host 28 according to the invention comprises a workstation known in the art, such as a Sun Sparc workstation running BBN TimeScan and/or the WindView software visualization tool by Wind River Systems under the Solaris 1 or Solaris 2 operating system.

If the host is configured with an SVT that receives and processes Ethernet packets, the event files are passed from the data offloader 37 on the control card 14 directly over the Ethernet 26 to the SVT 36, 36'. Alternatively, the host may be configured with an SVT that cannot directly handle Ethernet packets, in which case a data storer 33 is required on the host to strip the event data from the communications packet and convert the information to a file format appropriate for storage and use by that SVT.

The host 28 is also configured with a control interface program and configuration tool 31 used to control and monitor control card operation. The control interface program and configuration tool comprises a graphical user interface used to configure, initialize and control the control card for operation as described hereinbefore. The control interface program and configuration tool 31 communicates with a server task running on the control card 14 as part of the control card initialization mechanism 35. Communication between the control interface program and configuration tool 31 and the server task running on the control card 14 is effected via the Ethernet 26. The server only handles one connection at a time, functioning as an iterative server such that a control card 14 can only be operated by one user at a time.

Configuration, initialization and control parameters can be/are generated on the host and downloaded to the control card via the Ethernet connection. In addition to the functionality described hereinbefore that is controlled and configured via the control interface program and configuration tool 31, the tool can be used to implement various features associated with event logging, such as gathering and displaying status information and/or statistics related to control card, target processor and/or host operation. VME or common bus operation can be affected or controlled as provided by the capabilities of the control card. For instance, the control card 14 can drive the VMEbus SYS_RESET signal causing all processors in a VME system to reset. Such a feature can be invoked under remote control from the host interface. When development is being done from a remote site, this feature can be quite helpful with applications that lock up their target processors. Numerous other features can be implemented, limited only by the capabilities of the control card, target processor(s) host workstation(s) and applicable graphical user interface development tools.

It should be appreciated by those skilled in the art, that where the control card appears in VME address space is changeable as a configuration option since different systems that may be monitored as target processors, allocate and use the VME address range differently. The control card can be configured to support access to its memory area using D32, D16, or D8, i.e. 32, 16 or 8 bit, data sizes. It will be further appreciated by those skilled in the art, that the MVME162LX used in the present illustrative implementation provides two different memory areas; SRAM (static RAM) and DRAM (dynamic RAM). In the illustrative embodiment described herein, the SRAM, which is battery backed, is mapped onto the VME bus and used for event data storage. The DRAM is used for storing the control card executable program and local data. Not mapping the DRAM containing the executable program and local data onto the VME bus avoids the possibility of target processors corrupting the control card program.

Although the event monitoring mechanism described herein is described as having a control card that is a Motorola MVME162LX implemented in the context of target processors configured on a VMEbus, it should be appreciated that other single board computers or microcontrollers (such as the MVME167) or general purpose microcomputers or the like can be configured according to the invention, and further, the event monitoring mechanism can be implemented on other common busses, such as PCI bus (used in PC systems), Futurebus+, or Sbus (used in Sun workstations), or the like.

Further, in some implementations, the event collection macro implemented herein might support user code or instrumented applications in different languages. For example, it will be appreciated that support for C, C++, and Fortran language macro calls would be desirable to allow flexibility to support varied environments.

While the control card in the event mechanism according to the invention includes an Ethernet network interface to the host system for transferring data for post-event collection processing, it will be appreciated that other network interfaces can be provided and communication protocols can be implemented.

Although the implementation described herein includes an event collection function called from a macro both run on the target processor for identifying events of interest, it will be appreciated that, while the macro call to the event logging function is more efficient, the logging function could operate in substantially the same way being directly called as a function from the instrumented application.

While selective compilation is used to select a version of the event collection function including common code for both slave mode and master mode as described herein, it will be appreciated that separate, distinct versions, i.e. two individual, event collection functions could be implemented, one for each of the slave and master modes.

Although the control card of event mechanism described periodically checks the event buffers approximately every 0.5 ms, it will be appreciated that greater or lesser frequency can be implemented for the control card to check the ring buffers for event data availability.

Although the invention has been shown and described with respect to an illustrative embodiment thereof, various other changes, omissions and additions in the form and detail thereof may be made therein without departing from the spirit and scope of the invention.

What is claimed is:

1. An apparatus monitoring events relating to timing inter-relationships in a target program running on at least one target processor on a common bus, comprising:
    a control card installed on said common bus via a bus interface, said control card including,
        a control processor to run a control program,
        a time stamp clock accessible to said control processor and accessible over said common bus to provide a time stamp for said events,
        a network interface accessible to said control processor to effect communication between said control processor and a host computer running a software visualization tool for processing said event information, and
        control card memory comprising a first memory portion storing said control program therein to effect functionality of said control card, said control card memory comprising a second memory portion for storing event information received directly from said target processors and a third memory portion for storing event information for transfer to said host computer,
    an event collection mechanism on said at least one target processor, said event collection mechanism collecting event information relating to said target program and operating in at least one of two modes including a first mode wherein said event information is stored in a control card memory buffer of said second memory portion on said control card, and a second mode wherein said event information is stored in a target processor memory buffer on said target processor.

2. The apparatus of claim 1 wherein said target program is instrumented with calls to a macro that invokes an event logging request.

3. The apparatus of claim 2 wherein said macro is selectively compiled to determine whether event monitoring is enabled.

4. The apparatus of claim 1 wherein said event information relating to said target program comprises an event id, an event class and at least one event specific parameter.

5. The apparatus of claim 1 wherein said target program is instrumented with calls to a macro which in turn calls a logging function to effect recording of events as the target program runs on said target processor.

6. The apparatus of claim 5 wherein said event collection mechanism is a function called by a macro resident for execution on said target processor and receives parameter inputs from said macro including an event id, an event class value, and event specific data values which are stored as an event record for further processing.

7. The apparatus of claim 6 wherein said logging function operates in said first mode and temporarily stores said event record in said control card memory buffer on said control card if said target processor has bus master capabilities for controlling said common bus or in said second mode and temporarily stores said event record in said target processor memory buffer on said target processor if said target processor does not have bus master capabilities for controlling said common bus.

8. The apparatus of claim 7 wherein in said first mode said target processor time stamps events by directly reading said time stamp clock on said control card and attaches a time stamp prior to transferring event information over said common bus for storing said event information in said control card memory buffer.

9. The apparatus of claim 7 wherein in said second mode said event information is stored in said target processor memory buffer on said target processor without a time stamp.

10. The apparatus of claim 9 wherein said control card is notified by said target processor by an interrupt indicating that event information is available.

11. The apparatus of claim 10 wherein said control card executes an event interrupt handler upon receipt of said interrupt, and said interrupt handler determines a source of said interrupt, and records an event notification item including an event index, a target identification value and a time stamp.

12. The apparatus of claim 9 wherein said control card periodically accesses said target processor memory buffer to collect available event information if any events have been indicated via interrupt.

13. The apparatus of claim 12 wherein said control card periodically accesses said target processor memory buffer to collect available event information at approximately 0.5 millisecond intervals.

14. The apparatus of claim 9 wherein target processors that can not generate interrupts are checked by said control card periodically to determine if they have any event information available.

15. The apparatus of claim 9 wherein said control card effects transfer of available event information from said target processor memory buffer on said target processor, attaches a time stamp according to said time stamp clock, and stores any retrieved event information to said second memory portion on said control card.

16. The apparatus of claim 1 wherein said control card effects transfer of event information to said host computer, via said network interface for analysis and display by said software visualization tool.

17. A method for monitoring events relating to timing inter-relationships in a target program running on at least one target processor on a common bus, said method comprising the steps of:
    installing a control card on said common bus, said control card including a control processor to run a control program, a time stamp clock accessible to said control processor to provide a time stamp for said events, a network interface accessible to said control processor, and control card memory comprising a first memory portion storing said control program therein to effect functionality of said control card, said control card memory comprising a second memory portion for storing event information received directly from said target processors and a third memory portion for storing event information for transfer;

instrumenting said target program with calls to an event collection mechanism to effect event logging requests;

collecting event information using said event collection mechanism on said at least one target processor, said event collection mechanism collecting event information relating to said target program in one of a first mode and a second mode;

storing said event information in said first mode in a control card memory buffer of said second memory portion on said control card and in a second mode storing said event information in a target processor memory buffer on said target processor; and transferring said event information to a host over said network interface for processing said event information using a software visualization tool running on said host.

18. The method of claim 17 wherein said step of instrumenting said target program with calls to said event collection mechanism to effect event logging requests involves instrumenting said target program with calls to a macro which in turn calls a logging function to effect recording of events as the target program runs on said at least one target processor.

19. The method of claim 17 wherein in said step of collecting event information, in said first mode said at least one target processor time stamps events by directly reading said time stamp clock on said control card and attaches a time stamp prior to transferring event information over said common bus and storing said event information in said second memory portion of said control card memory.

20. The method of claim 17 wherein in said step of collecting event information, in said second mode said event information is stored in said target processor memory buffer on said at least one target processor without a time stamp.

21. The method of claim 20 wherein in said step of collecting event information, in said second mode said control card is notified by said at least one target processor by an interrupt indicating that event information is available.

22. The method of claim 21 wherein in said step of collecting event information, said control card executes an event interrupt handler upon receipt of said interrupt, and said interrupt handler determines a source of said interrupt, and records an event notification item including an event index, a target identification value and a time stamp.

23. The method of claim 22 wherein in said step of collecting event information in said second mode said control card periodically accesses said target processor memory buffer to collect available event information if any events have been indicated via interrupt.

24. The method of claim 17 wherein in said step of collecting event information, in said second mode any target processor of said at least one target processor that can not generate interrupts are checked by said control card periodically to determine if they have any event information available to be collected by said control card.

* * * * *